US011375286B1

United States Patent
Peter et al.

(10) Patent No.: US 11,375,286 B1
(45) Date of Patent: Jun. 28, 2022

(54) PRE-FETCH OF DATA USING SEEK INTERVALS

(71) Applicant: Western Digital Technologies, Inc., San Jose, CA (US)

(72) Inventors: Eldhose Peter, Bengaluru (IN); Rakesh Balakrishnan, Bengaluru (IN); Ruchir Sinha, Lucknow (IN); Govind Kumar Mangal, Dholpur (IN)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 17/187,060

(22) Filed: Feb. 26, 2021

Related U.S. Application Data

(60) Provisional application No. 63/132,021, filed on Dec. 30, 2020.

(51) Int. Cl.
  *H04N 7/173* (2011.01)
  *H04N 21/6587* (2011.01)
  *H04N 21/234* (2011.01)
  *H04N 21/8547* (2011.01)

(52) U.S. Cl.
  CPC ... *H04N 21/6587* (2013.01); *H04N 21/23406* (2013.01); *H04N 21/8547* (2013.01)

(58) Field of Classification Search
  CPC ........... H04N 21/6587; H04N 21/8547; H04N 21/23406
  See application file for complete search history.

(56) References Cited

U.S. PATENT DOCUMENTS

| | | | | |
|---|---|---|---|---|
| 6,188,835 B1* | 2/2001 | Grandbois | ........... | H04N 9/8042 386/334 |
| 6,453,115 B1* | 9/2002 | Boyle | .................... | G11B 20/10 386/346 |
| 2007/0271388 A1* | 11/2007 | Bowra | .................. | H04L 65/602 709/231 |
| 2009/0168903 A1* | 7/2009 | Vaquero | ............. | H04N 21/2368 375/240.28 |
| 2010/0122277 A1* | 5/2010 | Fonseca | ................. | H04N 5/765 725/10 |
| 2013/0117406 A1* | 5/2013 | Chevillat | ........... | H04N 21/4113 709/217 |
| 2015/0373383 A1* | 12/2015 | Pichumani | ......... | H04N 21/4825 725/90 |
| 2018/0359331 A1* | 12/2018 | Jin | .......................... | H04L 69/40 |

* cited by examiner

*Primary Examiner* — Gigi L Dubasky
(74) *Attorney, Agent, or Firm* — Chang & Hale LLP

(57) ABSTRACT

A data storage device comprises a non-volatile memory, a buffer, and a controller. The controller is configured to decode a media file to extract timestamp information related to a set of frames of the media file and receive, from a host, a seek command associated with playback of the media file. The seek command includes a seek interval. The controller is further configured to remove at least a portion of the set of frames based at least in part on the seek interval and the extracted timestamp information and transmit a subset of the set of frames, not including the removed at least a portion of the set of frames, to the host.

20 Claims, 7 Drawing Sheets

PRE-FETCH OF DATA USING SEEK INTERVALS

CROSS-REFERENCE TO RELATED APPLICATIONS

This application claims priority to U.S. Provisional Application No. 63/132,021, filed Dec. 30, 2020 and entitled "Pre-Fetch of Data Using Seek Intervals," the entire contents of which are incorporated herein by reference.

BACKGROUND

Field

The present disclosure relates to data storage systems. In particular, the present disclosure relates to pre-fetching of data in data storage systems for media data or other types of data.

Description of Related Art

Users may access data, such as files, in various types of data storage systems/architectures. As an example, users may request media data from media servers, which in turn may access requested media data from storage systems in order to provide to users. Media data requested by users can be played back by media players on user devices. Users may perform seek operations or scroll operations relating to media data.

SUMMARY

Some implementations of the present disclosure relate to a data storage device comprising a non-volatile memory, a buffer, and a controller. The controller is configured to decode a media file to extract timestamp information related to a set of frames of the media file and receive, from a host, a seek command associated with playback of the media file. The seek command includes a seek interval. The controller is further configured to remove at least a portion of the set of frames based at least in part on the seek interval and the extracted timestamp information and transmit a subset of the set of frames, not including the removed at least a portion of the set of frames, to the host.

The media file may be a video file. In some embodiments, the controller is further configured to store the extracted timestamp information. The seek interval may be indicated in a unit of time.

In some embodiments, the seek interval is indicated as a multiple of a value. The removed at least a portion of the set of frames may include a repeating pattern of frames.

The seek interval may relate to a fast-forward operation. In some embodiments, the seek interval relates to a reverse operation.

In some embodiments, the controller is further configured to receive, from the host, a logical block address (LBA) indicating a current playback position of the media file. The seek command may include an indication of a length of a seek operation.

Some implementations of the present disclosure relate to a method comprising decoding a media file to extract timestamp information related to a set of frames of the media file and receiving, from a host, a seek command associated with playback of the media file. The seek command includes a seek interval. The method further comprises removing at least a portion of the set of frames based at least in part on the seek interval and the extracted timestamp information and transmitting a subset of the set of frames, not including the removed at least a portion of the set of frames, to the host.

In some embodiments, the media file is a video file. The method may further comprise storing the extracted timestamp information.

The seek interval may be indicated in a unit of time. In some embodiments, the seek interval is indicated as a multiple of a value. The removed at least a portion of the set of frames may include a repeating pattern of frames.

In some embodiments, the seek interval relates to a fast-forward operation. The seek interval may relate to a reverse operation.

The method may further comprise receiving, from the host, an LBA indicating a current playback position of the media file. In some embodiments, the seek command includes an indication of a length of a seek operation.

In accordance with some implementations of the present disclosure, a data storage device comprises means for decoding a media file to extract timestamp information related to a set of frames of the media file and means for receiving, from a host, a seek command associated with playback of the media file. The seek command includes a seek interval. The data storage device further comprises means for removing at least a portion of the set of frames based at least in part on the seek interval and the extracted timestamp information and means for transmitting a subset of the set of frames, not including the removed at least a portion of the set of frames, to the host.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
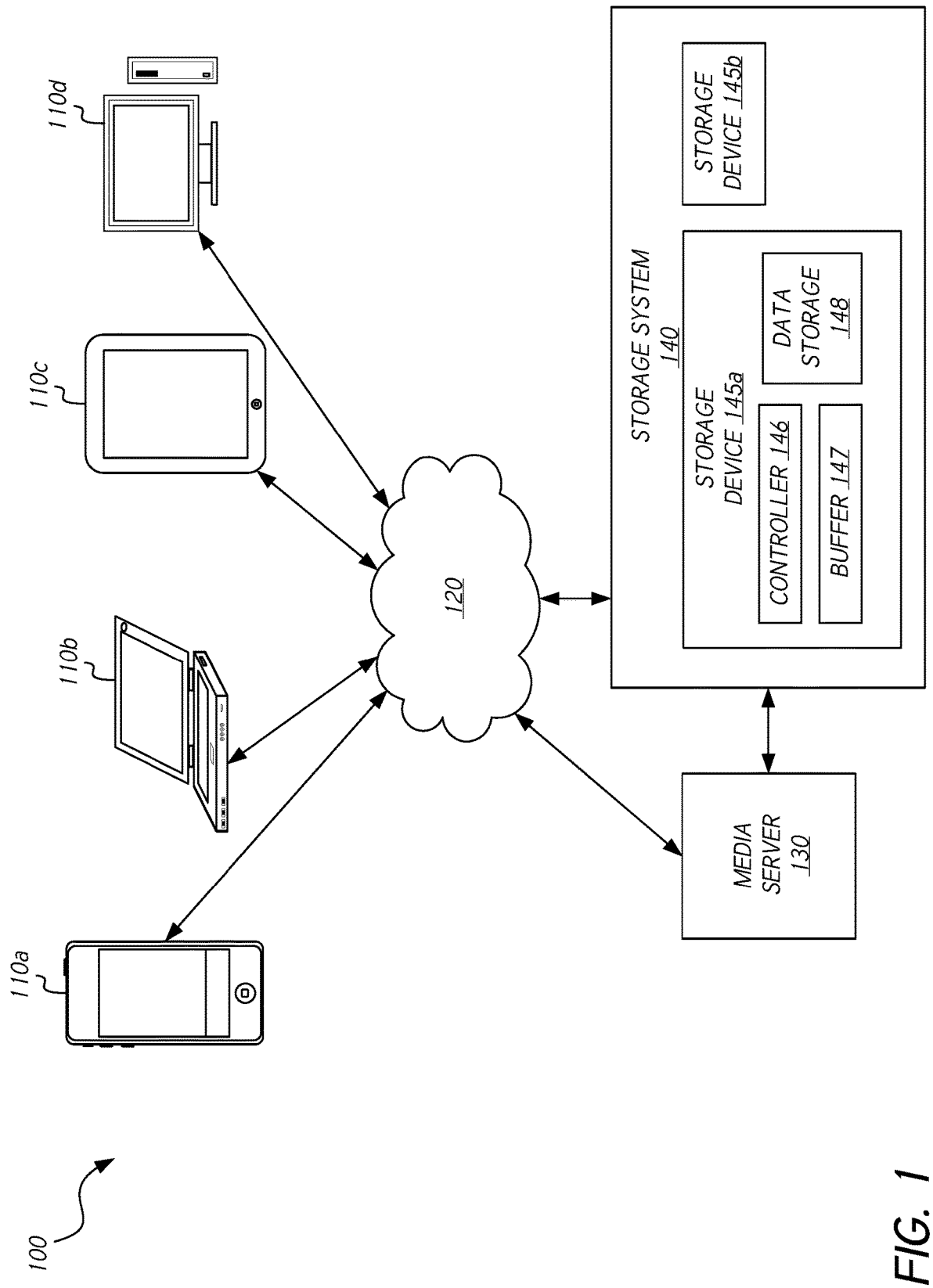
FIG. 1 illustrates an example system architecture for an example storage system relating to data storage and/or fetching for media data, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

A user may play a media file using a media player on a user device. Responsive to a user performing a seek operation or a scroll operation during playback of a media file on a user device, a data storage system and/or device can receive a seek command from a media server and/or the user device. Users may request or access different types of data from storage systems, for example, using one or more applications. In some cases, data can be media data, and users may request playback of media data from media servers. For example, users may access media files using media players on user devices. Media servers in turn may access and provide requested media data from storage systems. Requested media data transmitted to user devices may be played back using media players. Users may perform various operations relating to media data during playback, including seek operations or scroll operations.

Seek/scroll operations can include fast-forward and/or reverse operations, which can enable users to skip portions of media content. In some systems, frames of the media content may be displayed (e.g., in a full screen and/or in a thumbnail) while a seek operation is performed to enable users to view a current position of the seek operation before resuming play at a default speed (e.g., 1× speed).

Media data cached in a buffer may be cached sequentially. In some cases, the media data may not be cached for different seek intervals and/or speeds. For example, a user may select a fast-forward operation of 2× or 10× speed, however the data may not be cached specifically for such seek intervals. As a result, when a user requests a seek operation, a media application may load all frames from the storage device sequentially and/or may drop any frames which are not required. For example, at 10× speed, the media application may keep every $10^{th}$ frame and drop all other frames. These unneeded frames/data fetched from the storage device can impact performance the user's media device and can consume a significant amount of unnecessary bandwidth.

Some embodiments of the present disclosure advantageously make use of timestamp and/or similar data to pre-fetch media data from a storage device using a seek speed/interval at a host device. In some embodiments, a controller can be configured to extract and/or store timestamp information from encoded files received from a host device. Responsive to a seek operation performed at the host device, the host device can communicate to the controller the seek speed/interval associated with the seek operation. The controller can use the timestamp information and/or the seek speed/interval to pre-fetch only necessary frames from a storage device (e.g., a NAND).

The controller may comprise a general-purpose processor and/or any means for decoding to run a decoding algorithm and/or may utilize dedicated video decoding hardware and/or firmware to detect if incoming data from the host device is a media file. Upon detecting that incoming data is a media file, the controller may be configured to extract the timestamp information. The controller may further be configured to store the timestamp information in metadata structures used for addressing data stored in the storage device (e.g., a logical block address to physical block address (L2P) table).

FIG. 1 illustrates an example system architecture 100 for an example storage system 140 relating to data storage and/or fetching for media data, in accordance with one or more embodiments. The architecture 100 can include one or more user or client computing devices 110, which may be coupled to one or more media servers 130 via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

The architecture 100 can also include the storage system 140 for performing pre-fetching relating to media data. The media server 130 may be coupled to the storage system 140 directly or via the network 120. The storage system 140 can include one or more storage devices 145 (e.g., a first storage device 145a and/or a second storage device 145b). A first storage device 145a can include a controller 146, a buffer 147, and data storage 148 (e.g., non-volatile memory). A second storage device 145b can also include similar components. While the controller 146 is shown in FIG. 1 as part of the storage system 140 and storage device 145, the controller 146 may be a separate device. The storage system 140 may store data and/or data objects that may be accessed by the media server 130 and the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and RAM technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

A user can access and play a media file on a client computing device 110 using a media player. For example, the client computing device 110 can send a request to a media server 130 for playback of the media file, and the media server 130 can retrieve the media file from the storage system 140. The media file can be provided to the client computing device 110, for example, for streaming. In some cases, the media server 130 and the client computing device 110 may be a part of or implemented on the same computing device. In some embodiments, a "host" can refer to a system or device from which media data on a storage system or device is accessed or requested. For instance, the client computing device 110 or the media server 130 can be a host, depending on the embodiment. In some embodiments, a "device" can refer to a storage system or device from which media data is obtained, for example, to provide to a host.

During playback of the media file on the client computing device 110, the user can perform a seek operation or a scroll operation for the media file. Responsive to the user performing a seek operation, a seek command can be sent from the client computing device 110 to the media server 130, and the media server 130 can send a seek command to the storage system 140. For example, a seek command can include information such as current data being played back, a seek interval, etc. The storage system 140 and/or any means for receiving can receive the seek command and remove at least a portion of a set of frames (e.g., unnecessary frames) for the media file relating to one or more seek points. For instance, a storage device 145 storing the media file can receive and process the seek command, which can include an indication of the seek interval/speed. The controller 146 can use timestamp information for the media file and the seek command to return only a portion of the frames stored at the storage device 145 based at least in part on the seek interval/speed.

While a media file is being played back at a client computing device 110, the user may perform a seek operation or a scroll operation for the media file. A seek operation or a scroll operation can navigate through or skip to another point within the media file. A seek operation or a scroll operation can be forward or backward. In some cases, a seek operation can occur at a regular interval and skip to the next seek point. In response to the user performing the seek operation or the scroll operation during playback of the media file, the storage system 140/storage device 145 can receive a seek command from the media server 130 and/or the client computing device 110. For example, the media server 130 can receive a seek command from the client computing device 110, and the media server 130 in turn can send a seek command to the storage system 140. In response to the user performing the seek operation or the scroll operation, data subsequent to the current data being played back, including buffered data, at the client computing device 110, the media server 130, and/or the storage system 140 may be discarded.

The seek command can include various parameters or information associated with fetching and/or pre-fetching of media data. For example, the seek command can include information such as current data for playback and/or a seek interval. The current data for playback may be indicated as a time, in units of time (e.g., seconds, minutes, etc.), in units of data (e.g., bit, byte, kilobyte, megabyte, etc.), etc. The seek interval may be indicated in a unit of time (e.g., seconds, minutes, etc.). Examples of a seek interval specified in a unit of time can include 10 seconds, 30 seconds, 1 minute, 10 minutes, etc. In some cases, the seek interval may be indicated as a multiple of a predetermined value. The storage system 140 may be able to identify the predetermined value based on preconfigured settings on the storage system 140. For example, the storage system 140 can receive and store preconfigured settings associated with media players in advance. Examples of a seek interval specified as a multiple of a predetermined value can include 1x, 2x, etc., where "x" indicates the predetermined value. For instance, "x" can be specified in a unit of time. Examples of "x" can include 10 seconds, 30 seconds, 1 minute, 10 minutes, etc. The client computing device 110 and/or the media server 130 can also send additional information, such as a bit rate for playback, an average frame length, a frame length list, etc. The additional information may be included in the seek command or may be sent separately.

A seek interval can indicate an interval to a subsequent seek point or between two seek points. The seek interval can be specified in a unit of time (e.g., 10 seconds) or as a multiple of a predetermined value (e.g., "x" or "1x"). The predetermined value can be determined from preconfigured settings stored on the storage device 245. The predetermined value may be specified in a unit of time (e.g., 10 seconds). The seek points can be determined in relation to current data being played back. Or the seek points can be determined in relation to current data for the media file that has been uploaded to a buffer and/or transferred to a media server. As an example, if the seek interval is 10 seconds, three seek points can correspond to 10 seconds, 20 seconds, and 30 seconds from the current data. As another example, if the seek interval is x or 1x, three seek points can correspond to 1x, 2x, and 3x from the current data, where x can be 10 seconds. Accordingly, 1x, 2x, and 3x can correspond to 10 seconds, 20 seconds, and 30 seconds, respectively.

In some embodiments, the storage system 140 can receive and store preconfigured settings associated with media players. For instance, the client computing device 110 and/or the media server 130 may send the preconfigured settings periodically or as needed. The storage system 140 can refer to the preconfigured settings when performing pre-fetches of media file frames. As an example, if a seek interval is specified as a multiple of a predetermined value, the storage system 140 can drop a number of frames corresponding to the seek interval. As another example, the storage system 140 may determine what a seek interval is based on the preconfigured settings without receiving the seek interval from the media server 130 or the client computing device 110. In certain embodiments, the storage system 140 can receive settings associated with media players dynamically, for example, in real time. For instance, information or parameters that vary over time can be sent to the storage system 140 as needed.

In response to receiving the seek command, the storage system 140/storage device 145 storing the media file can process the seek command. The storage system 140 can drop frames as necessary based at least in part on the seek interval included in the seek command. For example, if the seek interval is 10x, the storage system 140 may be configured to return every $10^{th}$ frame to the computing device 110 and drop nine consecutive frames between every $10^{th}$ frame.

Figure 2:
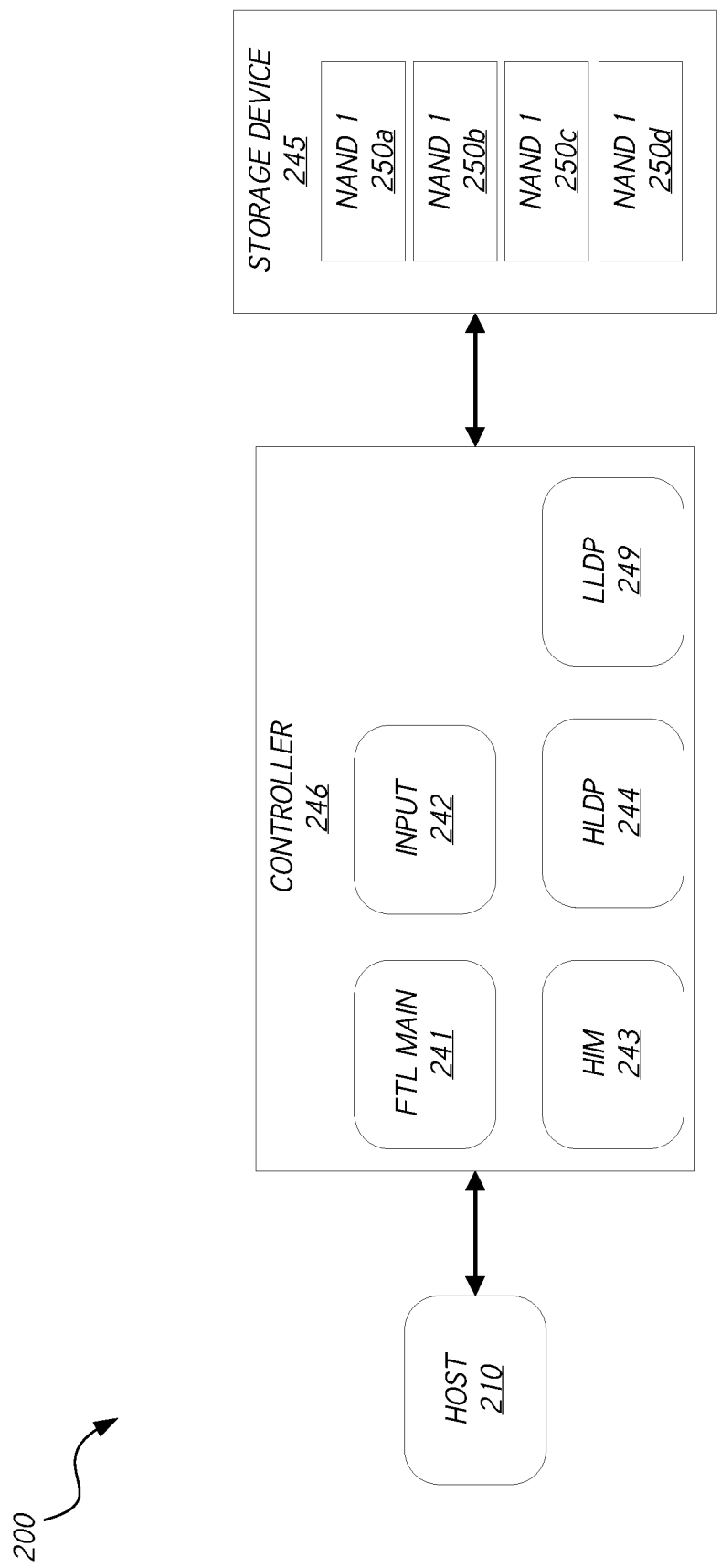
FIG. 2 provides a block diagram illustrating a data storage system in which a host can access media data from a storage device (e.g., a NAND array) via a controller, in accordance with one or more embodiments.

FIG. 2 provides a block diagram illustrating a data storage system 200 in which a host 210 can access media data from a storage device 245 (e.g., a NAND array) via a controller 246. The storage device 245 can include multiple NANDs 250, for example a first NAND 250a, a second NAND 250b, a third NAND 250c, and a fourth NAND 250d. The controller 246 can include a flash translation layer (FTL) 241, an input module 242, a host interface module (HIM) 243, a high level data processor (HLDP) 244, and/or a low level data process (LLDP) 249. In some cases, the controller 246 may not be configured to decode and/or detect media files received from the host 210.

Figure 3:
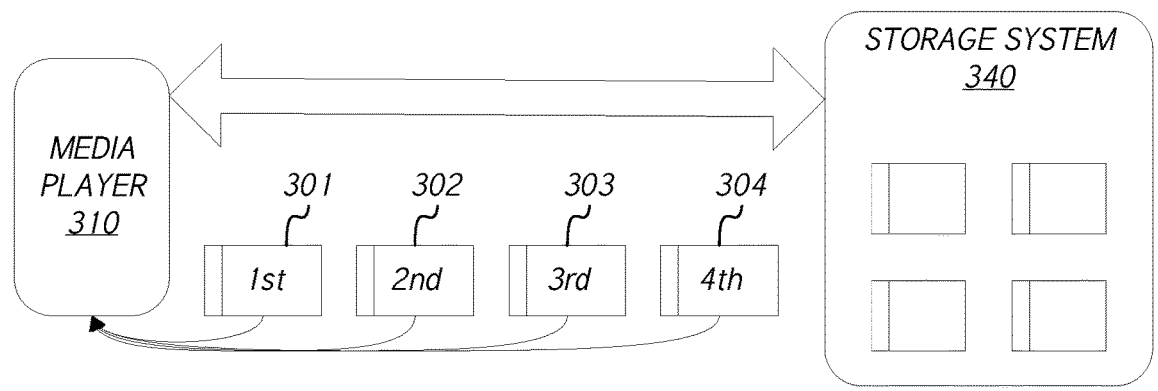
FIG. 3 provides a block diagram illustrating data transfer between a media player and a storage system, in accordance with one or more embodiments.

FIG. 3 provides a block diagram illustrating data transfer between a media player 310 (i.e., a host) and a storage system 340 (which may include a controller). During normal playback of a media file at the media player 310, the media player 310 may be configured to sequentially play a $1^{st}$ frame 301, a second frame 302, a third frame 303, and a fourth frame 304 received from the storage system 340. In response to a user of the media player 310 selecting a seek operation, the media player 310 may transmit a seek request to the storage system 340. If a controller of the storage system 340 is not configured to decode and/or otherwise extract timestamp information from the media file and/or selectively pre-fetch frames of the media file based on seek intervals, the storage system 340 may continue to provide the $1^{st}$ frame 301, second frame 302, third frame 303, and fourth frame 304 to the media player 310 in response to the seek request.

Because the media player 310 may not display every frame of the media file during a seek operation, the media player 310 may drop some frames received from the storage system 340. For example, during a 2x seek operation, the media player 310 may be configured to drop the $2^{nd}$ frame 302 and the $4^{th}$ frame 304 or to drop the first frame 301 and the third frame 303 along with additional other frames provided subsequently by the storage system 340. As another example, during a 4x seek operation, the media player 310 may be configured to drop the $2^{nd}$ frame 302, third frame 303, and the $4^{th}$ frame 304 along with additional other frames provided subsequently by the storage system 340. These dropped frames nevertheless consume RAM at the media player 310.

Figure 4:
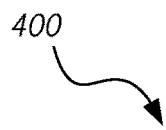
FIG. 4 provides a block diagram illustrating a write/read process for a data storage system in accordance with some embodiments.

FIG. 4 provides a block diagram illustrating a write/read process for a data storage system 400 in accordance with some embodiments. During a write phase, data from a host 410 (e.g., including one or more media players 411) may be stored in a storage device 445. During a read phase, one or more frames may be transmitted from the storage device 445 to the host 410, where the host 410 can drop any unnecessary frames.

Transmission of data between the host 410 and the storage device 445 can be facilitated by a controller 446 (e.g., a flash controller) and/or any means for transmitting, which may be configured to communicate bi-directionally with the host 410 and/or the storage device 445. The controller 446 may comprise a host interface module 439 to enable the controller 446 to communicate with the host 410. The controller 446 may also comprise an FTL 441 and level-2 pre-processed data format specification module (i.e., L2P) 438 and/or other format specification module. The FTL 441 may be configured to update mappings of the L2P 438. For example, during the read phase, the FTL 441 may be configured to perform a lookup of a given location at the L2P 438.

During the write phase, the FTL 441 may be configured to write received media data to the storage device 445. The storage device 445 may be configured to store data within any of a variety of data blocks 448. During the read phase, the controller 446 may be configured to receive a series of frames from the storage device 445 and/or to transmit the frames to the host 410. The frames may be transmitted sequentially and/or as a set of sequential frames.

Pre-Fetching Storage Systems

Figure 5:
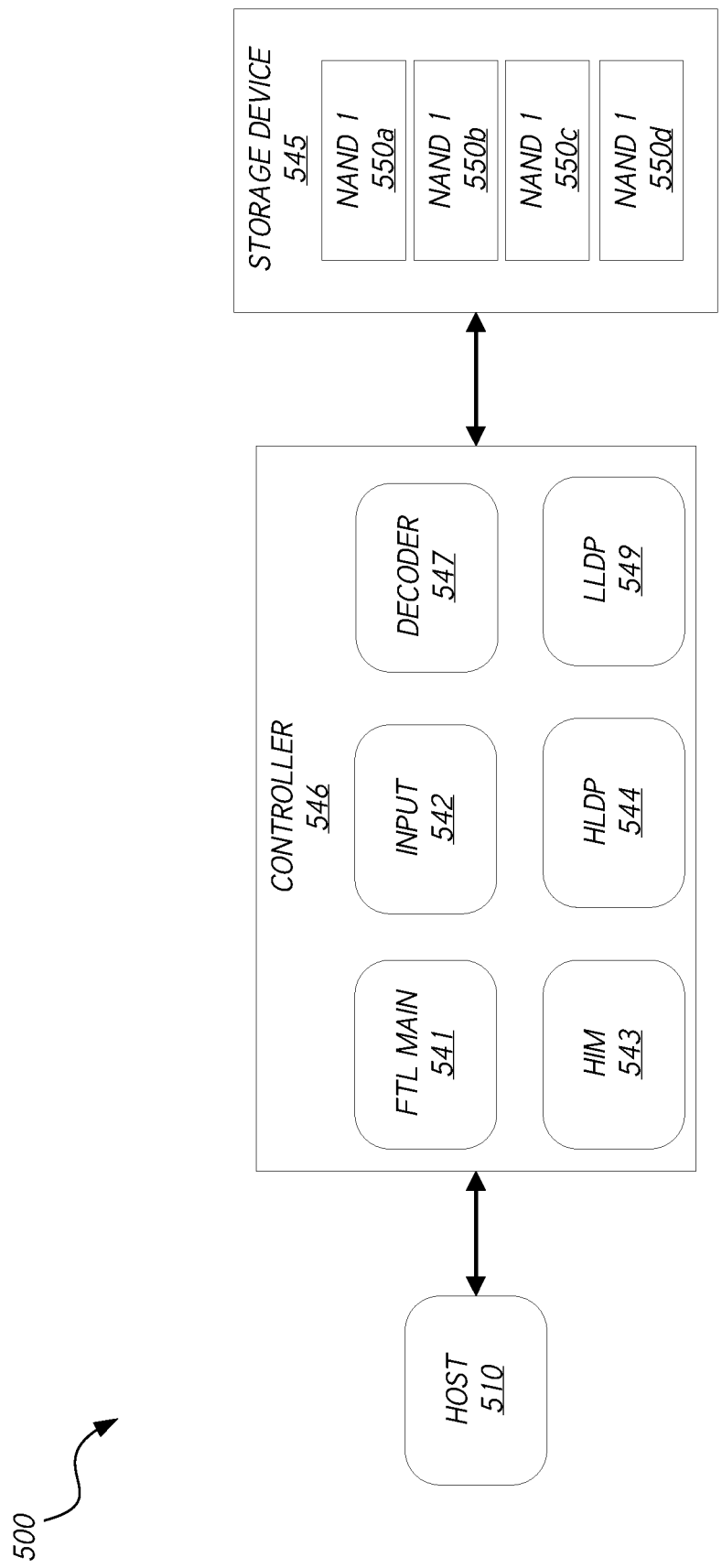
FIG. 5 provides another block diagram illustrating a storage system for pre-fetching frames of a media file in accordance with some embodiments.

FIG. 5 provides another block diagram illustrating a storage system 500 for pre-fetching frames of a media file in accordance with some embodiments. A host 510 can access media data from a storage device 545 (e.g., a NAND array) via a controller 546. The storage device 245 can include multiple NANDs 550. The controller 546 can include a FTL 541, an input module 542, an HIM 543, an HLDP 544, and/or an LLDP 549. In some embodiments, the controller 546 may further comprise a video decoder 547 configured to decode media data received from the host 510. Decoding the media data at the video decoder 547 can involve extracting timestamp information related to one or more frames of the media data.

In some embodiments, the host 510 may be configured to transmit seek requests in response to seek operations at the host 510. Such seek requests may include information indicating a seek interval associated with the seek requests. Using the seek interval, the controller 546 (e.g., the FTL 541) and/or any means for removing may be configured to remove at least a portion of a set of frames (e.g., unnecessary frames) prior to transmitting the set of frames to the host 510. In some embodiments, the controller 546 may also utilize a current playback location of the media data in removing unnecessary frames. For example, for a 4x seek operation, the controller 546 may be configured to return a first frame relating to a current playback location and may drop the three immediate subsequent frames. This pattern may be repeated (transmitting only every fourth frame) until the seek operation has concluded.

Figure 6:
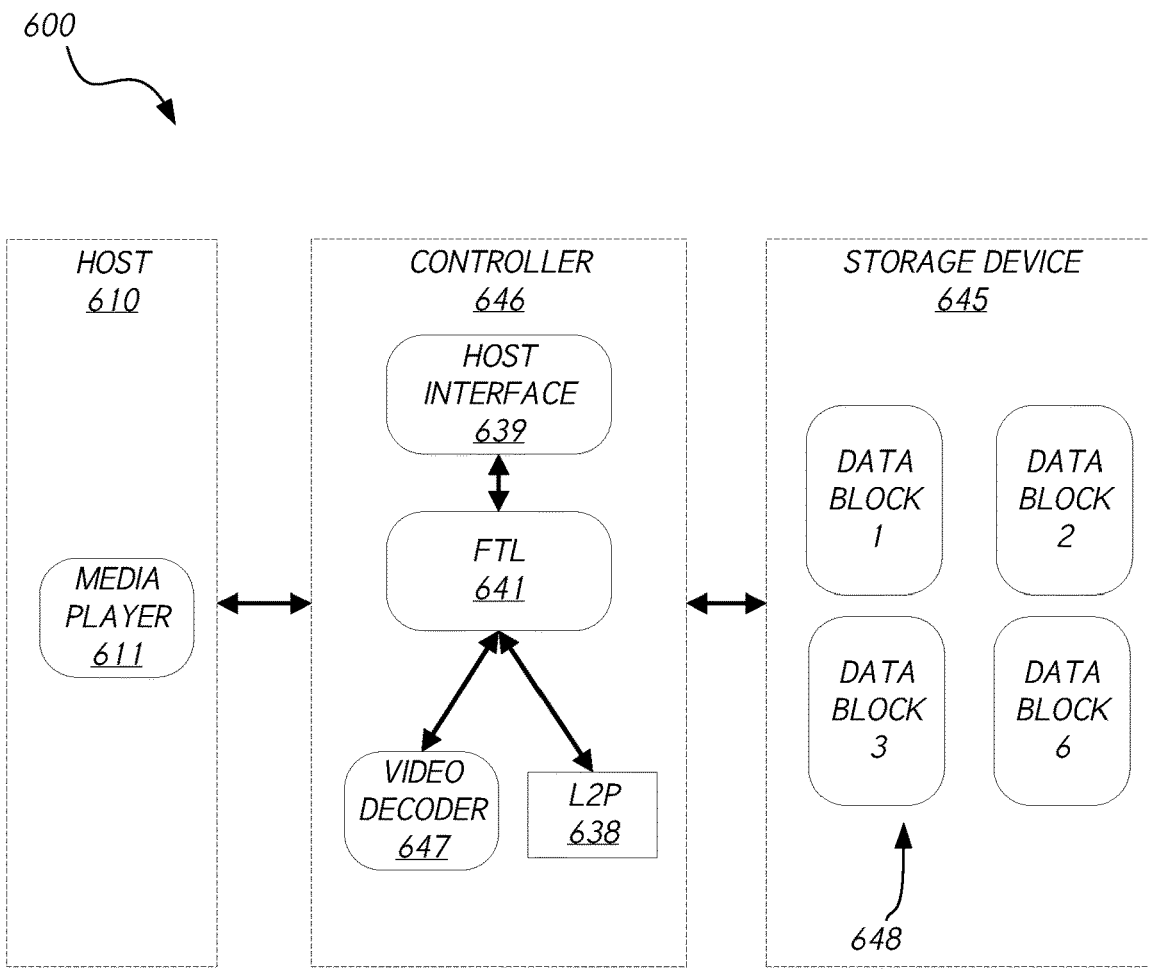
FIG. 6 provides a block diagram illustrating a write/read process for a data storage system in accordance with some embodiments.

FIG. 6 provides a block diagram illustrating a write/read process for a data storage system 600 in accordance with some embodiments. During a write phase, data from a host 610 (e.g., including one or more media players 611) may be stored in a storage device 645 (e.g., in one or more data blocks 648). During a read phase, one or more frames may be transmitted from the storage device 645 to the host 610.

Transmission of data between the host 610 and the storage device 645 can be facilitated by a controller 646 (e.g., a flash controller), which may be configured to communicate bi-directionally with the host 610 and/or the storage device 645. The controller 646 may comprise a host interface module 639 to enable the controller 646 to communicate with the host 610. The controller 646 may also comprise an FTL 641 and level-2 pre-processed data format specification module (i.e., L2P) 638 and/or other format specification module. The FTL 641 may be configured to update mappings of the L2P 638. For example, during the read phase, the FTL 641 may be configured to perform a lookup of a given location at the L2P 638.

In some embodiments, the controller 646 may comprise a video decoder 647 configured to decode media data received from the host 610. The video decoder 647 may be configured to extract timestamp information and/or other frame decoded information from the media data and provide the extracted information to the FTL 641. The FTL 641 may be configured to update the L2P 638 with the extracted information.

In response to a seek operation at the host 610, the host 610 may be configured to transmit a seek request, including an indication of a seek interval, to the controller 646. In some embodiments, the host interface module 639 may be configured to read from the host 610, in response to the seek request, a logical block address (LBA) indicating a current playback position, a length of a seek operation, and/or a seek interval. The FTL 641 may be configured to read the extracted timestamp information and/or other information from the L2P 638 in response to the seek request. The controller 646 may be configured to use the timestamp information, seek interval, and/or a current playback position of the media data to determine which frames may be required for transfer to the host 610. Accordingly, the controller 646 may read from the storage device 645 only the frames which may be required based on the timestamp information, seek interval, and/or current playback position.

Figure 7:
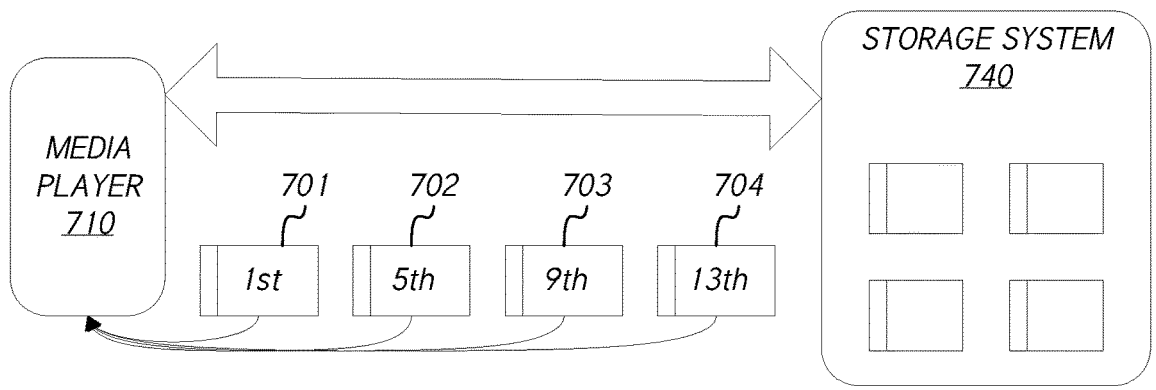
FIG. 7 provides a block diagram illustrating data transfer between a media player and a storage device configured to pre-fetch frames using timestamp and seek interval information in accordance with some embodiments.

FIG. 7 provides a block diagram illustrating data transfer between a media player 710 (i.e., a host) and a storage device 740 (which may include a controller) configured to pre-fetch frames using timestamp and seek interval information in accordance with some embodiments. The example in FIG. 7 relates to a seek operation for a 4x seek interval, however other seek intervals may be used. For a 4x seek interval, the frames 701 read from the storage system 740 and/or transmitted to the host 710 may be a $1^{st}$ frame 701, a $5^{th}$ frame 702, a $9^{th}$ frame 703, a $13^{th}$ frame 704, and so on, as shown in FIG. 7. In this way, the host 710 may not be required to drop any frames 701 even during a seek operation, thereby making efficient use of bandwidth at the host 710.

Figure 8:
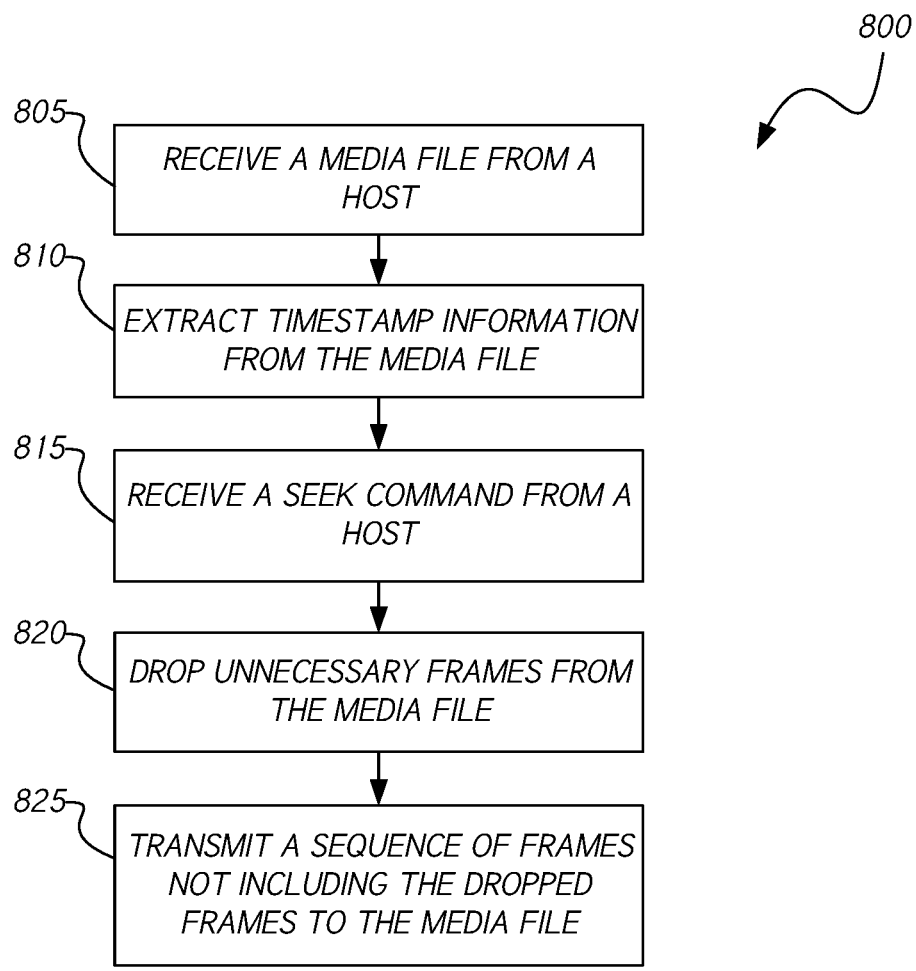
FIG. 8 illustrates a workflow process for efficient pre-fetching of media data during seek operations, in accordance with one or more embodiments.

FIG. 8 illustrates a workflow process 800 for efficient pre-fetching of media data during seek operations, in accordance with one or more embodiments. For example, the workflow process 800 may be performed by a controller of a storage system or a storage device, such as a storage system or a storage device. Depending on the embodiment, the process 800 may include fewer or additional blocks, and the blocks may be performed in an order that is different from illustrated.

At block 805, the process 800 involves receiving (e.g., at a storage system) a media file from a host (e.g., a media server, a client computing device, etc.). The media file may be received in an encoded form and/or may comprise various timestamp information associated with individual frames of the media file. In some embodiments, the media file may be a video file.

At block 810, the process 800 involves extracting timestamp and/or other encoded information from the media file. The timestamp and/or other encoded information can be stored for later access during a seek operation.

At block 815, the process 800 involves receiving (e.g., at a storage system) a seek command from the host. The seek command can be associated with playback of the previously received media file. In some embodiments, the seek command can include a seek interval. In certain embodiments, the seek interval is indicated in a unit of time. In other embodiments, the seek interval is indicated as a multiple of a predetermined value. In some embodiments, the seek interval may not be received from the host and/or may be determined using stored data associated with the host.

In some cases, other information may be received from the host. In some embodiments, information received from the host can include one or more of current data for playback, a bit rate for the media file, a frame length for the media file, or a frame length list for the media file.

At block 820, the process 800 involves dropping unnecessary frames from a set of frames to be sent to the host. The dropped frames may be determined at least in part using the extracted timestamp information and/or seek interval. In some embodiments, a repeating pattern of dropping frames may be established based on the seek interval. For example, for a 2x seek interval, every other frame may be maintained and/or every other frame (offset by one frame) may be dropped. For a 4x seek interval, every fourth frame may be maintained while all other frames may be dropped.

At block 825, the process 800 involves transmitting a sequence of frames not including the dropped frames to the host.

Figure 9:
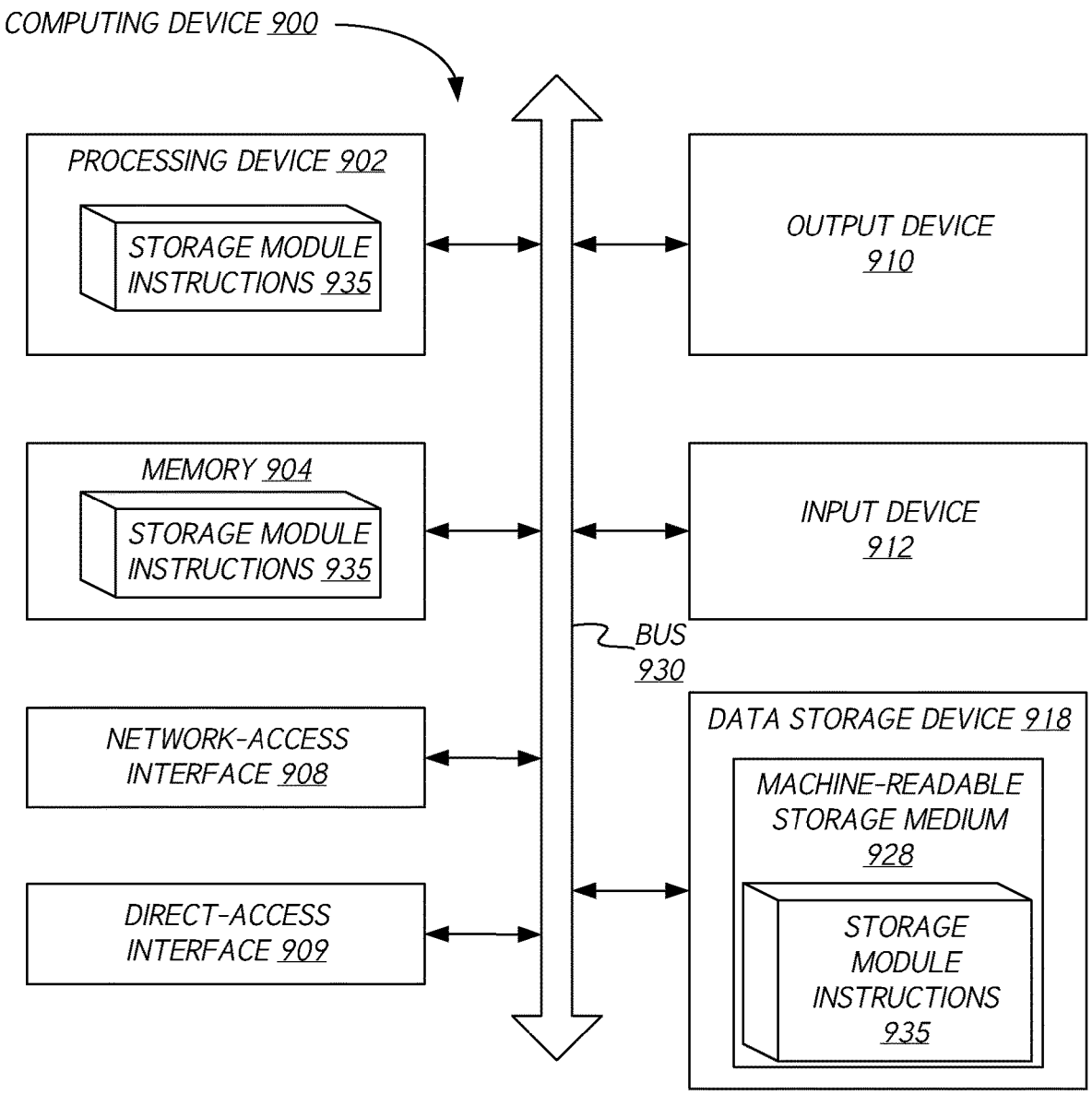
FIG. 9 is a diagram of a computing device, in accordance with one or more embodiments

FIG. 9 is a diagram of a computing device 900, in accordance with one or more embodiments. The computing device 900 may execute instructions that may cause the computing device 900 to perform any one or more of the methodologies (e.g., operations, methods, functions, etc.) discussed herein. The computing device 900 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 900 includes a processing device (e.g., a processor, a controller, a central processing unit (CPU), etc.) 902, a main memory 904 (e.g., read-only memory (ROM), flash memory, dynamic random access memory (DRAM) such as synchronous DRAM (SDRAM)), a network-access interface 908, a direct-access interface 909, an output device, 910, an input device 912, and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute storage module instructions 935 for performing the operations and steps discussed herein.

The computing device 900 may include a network-access interface 908 (e.g., a network interface card, a Wi-Fi interface, etc.) which may communicate with a network (e.g., network 120 illustrated in FIG. 1). The computing device may also include a direct-access interface 909 (e.g., a USB interface, an external Serial Advanced Technology Attachment (eSATA) interface, a Thunderbolt interface, etc.). The computing device 900 also may include an output device 910 (e.g., a liquid crystal display (LCD) or a cathode ray tube (CRT)), and an input device 912 (e.g., a mouse, a keyboard, etc.). In one embodiment, the output device 910 and the input device 912 may be combined into a single component or device (e.g., an LCD touch screen).

The data storage device 918 may include a computer-readable storage medium 928 on which is stored one or more sets of instructions (e.g., storage module instructions 935)

embodying any one or more of the methodologies or functions described herein. The storage module instructions 935 may also reside, completely or at least partially, within the main memory 904 and/or within the processing device 902 during execution thereof by the computing device 900. The main memory 904 and the processing device 902 may also constitute computer-readable media. The instructions may further be transmitted or received over via the network-access interface 908 and/or direct-access interface 909.

While the computer-readable storage medium 928 is shown in an example embodiment to be a single medium, the term "computer-readable storage medium" should be taken to include a single medium or multiple media (e.g., a centralized or distributed datastore and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer data storage device or collection of data storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
   a non-volatile memory;
   a buffer; and
   a controller configured to:
   decode a media file to extract timestamp information related to a set of frames of the media file;
   receive, from a display device, a seek command associated with playback of the media file, the seek command including a seek interval;
   receive, from the display device, a logical block address (LBA) indicating a current playback position of the media file;
   remove at least a portion of the set of frames based at least in part on the seek interval, the current playback position, and the extracted timestamp information; and
   transmit a subset of the set of frames, not including the removed at least a portion of the set of frames, to the display device.

2. The data storage device of claim 1, wherein the media file is a video file.

3. The data storage device of claim 1, wherein the controller is further configured to store the extracted timestamp information.

4. The data storage device of claim 1, wherein the seek interval is indicated in a unit of time.

5. The data storage device of claim 1, wherein the seek interval is indicated as a multiple of a value.

6. The data storage device of claim 1, wherein the removed at least a portion of the set of frames includes a repeating pattern of frames.

7. The data storage device of claim 1, wherein the seek interval relates to a fast-forward operation.

8. The data storage device of claim 1, wherein the seek interval relates to a reverse operation.

9. The data storage device of claim 1, wherein the seek command includes an indication of a length of a seek operation.

10. A method comprising:
   decoding a media file to extract timestamp information related to a set of frames of the media file;
   receiving, from a display device, a seek command associated with playback of the media file, the seek command including a seek interval;
   receiving, from the display device, a logical block address (LBA) indicating a current playback position of the media file;
   removing at least a portion of the set of frames based at least in part on the seek interval, the current playback position, and the extracted timestamp information; and
   transmitting a subset of the set of frames, not including the removed at least a portion of the set of frames, to the display device.

11. The method of claim 10, wherein the media file is a video file.

12. The method of claim 10, further comprising storing the extracted timestamp information.

13. The method of claim 10, wherein the seek interval is indicated in a unit of time.

14. The method of claim 10, wherein the seek interval is indicated as a multiple of a value.

15. The method of claim 10, wherein the removed at least a portion of the set of frames includes a repeating pattern of frames.

16. The method of claim 10, wherein the seek interval relates to a fast-forward operation.

17. The method of claim 10, wherein the seek interval relates to a reverse operation.

18. The method of claim 10, wherein the seek command includes an indication of a length of a seek operation.

19. A data storage device comprising:
   means for decoding a media file to extract timestamp information related to a set of frames of the media file;
   means for receiving, from a display device, a seek command associated with playback of the media file, the seek command including a seek interval;
   means for receiving, from the display device, a logical block address (LBA) indicating a current playback position of the media file;
   means for removing at least a portion of the set of frames based at least in part on the seek interval, the current playback position, and the extracted timestamp information; and
   means for transmitting a subset of the set of frames, not including the removed at least a portion of the set of frames, to the display device.

20. The data storage device of claim 1, wherein the display device is a media playback device.

* * * * *